Sept. 15, 1964   G. D. FIOCCO   3,149,330
FREQUENCY MODULATED DOPPLER RADAR SYSTEM
Filed Nov. 12, 1959   3 Sheets-Sheet 1

INVENTOR
Giorgio Domenico Fiocco
BY
Baldwin & Wight
ATTORNEYS

United States Patent Office

3,149,330
Patented Sept. 15, 1964

3,149,330
FREQUENCY MODULATED DOPPLER
RADAR SYSTEM
Giorgio Domenico Fiocco, Chelmsford, England, assignor to The Marconi Company Limited, London, England, a company of Great Britain
Filed Nov. 12, 1959, Ser. No. 852,287
Claims priority, application Great Britain Dec. 1, 1958
5 Claims. (Cl. 343—14)

This invention relates to radar systems, a term which is used in this specification to include radio altimeters since these can be regarded as radar systems in which the transmitted radio beam is projected downwards to a reflecting target constituted by the earth's surface. More specifically the invention relates to frequency modulated continuous wave (C.W.) radar systems wherein a frequency modulated transmitted wave, received after reflection from a target, is mixed with energy from the frequency-modulated transmitter, and a desired selected modulating frequency harmonic band resulting from such mixing is detected by beating with the corresponding harmonic of the modulating frequency. The detected resultant, which will include Doppler shift frequencies due to motion of targets, may be employed to indicate the velocity of a reflecting target. The object of the invention is to provide improved and simple means whereby, in a radar system of this kind, the range of a target can be ascertained.

The invention is illustrated in and further explained in connection with the accompanying simplified diagrammatic drawings in which FIGURE 1, which is provided for purposes of explanation, represents a frequency modulated velocity measuring radar system which is not in accordance with this invention and the other figures illustrate different embodiments of the present invention. Like references designate like parts throughout.

Figure 1:
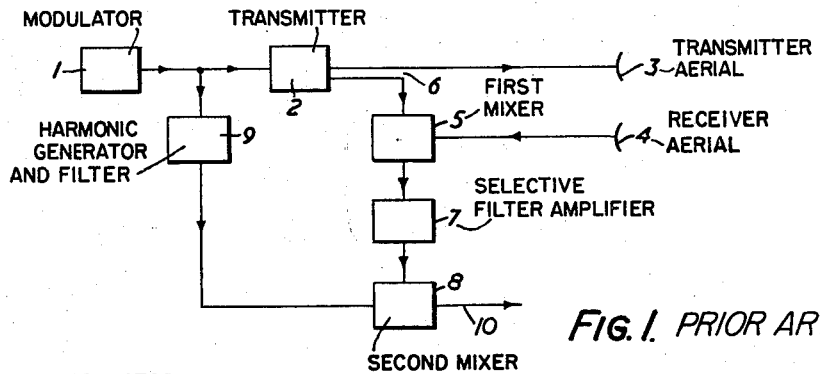

Referring to FIGURE 1 a sinusoidal source 1 of suitable frequency is employed to frequency modulate a microwave transmitter 2, the frequency modulated output from which is transmitted by a directional aerial represented at 3. Reflected energy from a target struck by the transmitted radio beam is received on an aerial 4 and mixed in a mixer 5 with some of the output energy from the frequency modulated transmitter 2 indicated as taken via a coupling 6. The low frequency output from the mixer 5 will consist of a spectrum of frequency bands centred on harmonics of the modulating frequency of the source 1 and each of these bands will be composed of two sidebands separated by twice the Doppler shift due to motion of the target in relation to the system. A desired one (the Nth) of these harmonic bands is selected by a selective filter-amplifier 7 whose output will be a double sideband suppressed carrier. This is detected in a second mixer 8 by mixing it with be Nth harmonic of the output from the source 1 derived by a harmonic generator and filter 9. The output from the mixer 8 will therefore consist of a frequency which depends on the Doppler shift and will be indicative of the velocity, towards or away from the system, of the reflecting target. This output is fed over output lead 10 to any convenient known utilisation and display means (not shown) where it is used in accordance with known techniques to display the relative velocity of the target.

The present invention provides improved frequency modulated radar systems which will provide range indication of a target. It may be used alone to measure range or in conjunction with a system as illustrated in FIGURE 1 to give range indication in addition to velocity indication. In the embodiments illustrated in FIGURES 2, 3, 4 and 5 the invention is illustrated as used as an addition to a velocity indicating system as illustrated in FIGURE 1.

The basic principle of the present invention resides in the utilisation of the fact, which may be shown mathematically, that the strength of the output signal from the mixer 8 is dependent, among other things, upon the range of the target. More specifically, if the modulating signal $V_a$ from source 1 is written:

$$V_a \alpha \sin pt \tag{1}$$

and the frequency modulated signal $V_b$ from transmitter 2 is written $$V_b \alpha \cos (qt + m \sin pt) \tag{2}$$

and the selected Nth harmonic frequency output from the harmonic generator-filter 9 is also a voltage $V_b$ as given by the expression $$V_b \alpha \sin (Npt + a) \tag{3}$$

it may be shown that the range-dependence of the strength of the output from the mixer 8 is given by the expression $$g(r) = J_N\left(2m \sin \frac{pr}{c}\right) \cos \left(a + N\frac{pr}{c}\right) \tag{4}$$

where $r$ is the range of the target and $c$ is the velocity of light. From the Bessel coefficient term $$J_N\left(2m \sin \frac{pr}{c}\right)$$

it will be seen that this has a semi-period $\Delta r$ which determines the distance separating successive null valves of the term and is given by $$\Delta r = \frac{\pi c}{p} \tag{5}$$

while, from the cosine term $$\cos \left(a + N\frac{pr}{c}\right)$$

it will be seen that this has a semi-period $\Delta r'$ which determines the distance separating successive null values of this term and is given by $$\Delta r' = \frac{\pi c}{pN} = \frac{\Delta r}{N} \tag{6}$$

The location of the nulls of the Bessel coefficient term is defined in space and occurs at ranges 0, $\Delta r$, $2\Delta r$, $3\Delta r$ . . . and so on, but the location of the nulls in the cosine term is determined by the phase angle $a$ in expression (3) above and occurs at $$\frac{\Delta r}{N}\left(\frac{1}{2} - \frac{a}{\pi}\right); \frac{\Delta r}{N}\left(\frac{3}{2} - \frac{a}{\pi}\right); \frac{\Delta r}{N}\left(\frac{5}{2} - \frac{a}{\pi}\right) \cdot \cdot \cdot$$

and so on.

It follows therefore that, if the value of the phase angle $a$ is adjusted to bring one of these phase-dependent nulls to coincide with a particular location of the target, the range of the target can be determined (apart from ambiguity depending on the integral number of range intervals, each of magnitude $$\frac{\Delta r}{N}$$

in the maximum range of the system) by noting that value of $a$ at which the output of the mixer 8 is brought to zero strength.

According to this invention a range measuring frequency modulated C.W. radar system comprises a transmitter adapted to transmit a high frequency radio wave frequency modulated by at least one predetermined modulating frequency; means for mixing received reflected transmitted energy with energy taken from said transmitter; means for selecting from the output of said mixing means a predetermined band of frequencies including a predetermined selected harmonic of said modulating frequency; means for deriving from the predetermined modulating frequency the same predetermined harmonic of said frequency; and means for utilising the phase relation between said derived harmonic and said selected harmonic for determining the range of a reflecting target.

In one arrangement in accordance with this invention the output from said mixing means and output from the means for deriving a harmonic from the modulating frequency are fed through channels one of which includes a variable phase shifter to a mixer the output from which is fed to a strength measuring device whereby the range can be ascertained by adjusting the phase shifter until the mixer output is substantially zero and noting the adjustment. In a modification of this arrangement the strength measuring device responsive to input signal strength fed thereto is arranged automatically to adjust the phase shifter until the said input signal strength is brought substantially to zero. Where it is required also to ascertain the relative velocity of a target, output from said mixer and variably phase-shifted output from the means for deriving a harmonic from the modulating frequency may be fed to a further mixer through channels one of which contains a 90° phase shifter, the output frequency from said further mixer being measured to determine target relative velocity.

In another arrangement in accordance with this invention oscillations from an oscillator of frequency slightly different from the frequency of said predetermined derived harmonic are mixed in one further mixer with output from said mixing means and in another further mixer with output from the means for deriving a harmonic from the modulating frequency and the outputs from the two said further mixers are employed to produce mutually perpendicular co-ordinate deflections in a cathode ray display tube.

In cases in which the total range of the system is long enough to give rise to ambiguity as hereinbefore explained, it is possible to avoid such ambiguity by means of a system comprising sources of two modulating frequencies of different predetermined values not in harmonic relationship; means for selecting from the output of the mixing means which mix reflected energy with energy from the transmitter, two separate predetermined bands of frequencies each including a predetermined harmonic of one or other of the two modulating frequencies; means for deriving from each of the two modulating frequencies the same predetermined harmonic thereof; means for mixing the selected harmonic frequency band corresponding to one modulating frequency with the derived harmonic of that frequency through two channels one of which includes a phase shifter; means for utilising the strength of the resultant of this mixing automatically to adjust said phase shifter until said resultant is substantially of zero strength; means for mixing the selected harmonic frequency band corresponding to the other modulating frequency with the derived harmonic of that frequency through two channels one of which includes a phase shifter; means for utilising the strength of the resultant of this mixing automatically to adjust the last mentioned phase shifter until the resultant of this mixing is substantially of zero strength; means for indicating the adjustment of one of the phase adjusters; means for multiplying the adjustment effected on said one phase shifter by the ratio of the two modulating frequencies; means for differentially combining the multiplied adjustment with the adjustment of the other phase shifter; and means for indicating the resultant of the differential combination.

The ambiguity in question can also be removed by means of a system comprising a modulating frequency source; means for selecting from the output of the mixing means which mix reflected energy with energy from the transmitter two separate predetermined bands of frequencies each including one or other of two different harmonics, which are not themselves in harmonic relation, of the modulating frequency; means for deriving the same two harmonics of the modulating frequency; means for mixing the upper selected harmonic band with the upper derived harmonic through two channels one of which includes a phase shifter; means for utilising the strength of the resultant of this mixing automatically to adjust said phase shifter until said resultant is of substantially zero strength; means for mixing the lower selected harmonic band with the lower derived harmonic through two channels one of which includes a phase shifter; means for utilising the strength of the resultant of this mixing automatically to adjust the last mentioned phase shifter until the resultant of this mixing is of substantially zero strength; means for indicating the adjustment of one of the two phase shifters; means for multiplying the adjustment effected by said one phase shifter by the ratio of the two harmonics; means for differentially combining the multiplied adjustment with the adjustment of the other phase shifter; and means for indicating the resultant of differential combination.

Figure 2:
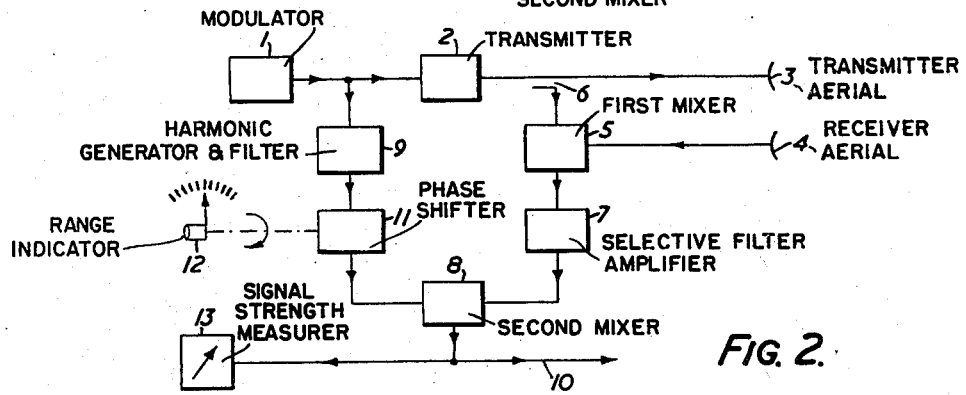

In the embodiment of the invention shown in FIGURE 2, a desired Nth harmonic of the modulating frequency from source 1 is derived by a harmonic generator and filter 9 and fed through an adjustable phase shifter 11 as one input to a mixer 8 whose other input is derived from a band pass filter-amplifier 7 adapted to select from the output from the mixer 5 a frequency band centred on the Nth harmonic and wide enough to include the two Doppler frequency side bands. The phase shift produced by the adjustable phase shifter 11 is represented as adjustable by a handle 12 which is provided with an indicating pointer moving over a scale. The range of adjustment of the phase shifter 11 should be at least 180°. Output from the mixer 8 is taken as in the known arrangement of FIGURE 1 over a lead 10 to velocity measuring and indicating equipment (not shown) and is also taken to a signal strength measuring unit 13. In use the handle 12 is adjusted until the signal strength indicated by the strength measuring unit 13 is substantially zero and the range of the target is then indicated by the position of the handle 12 the scale associated with which may therefore be marked in range.

Figure 3:
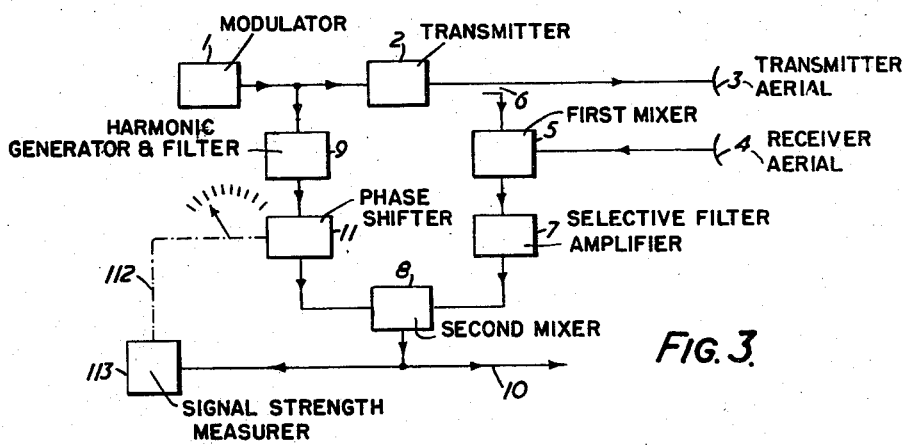

In the modification of FIGURE 3 the adjustment of the phase shifter 11, instead of being manual, is automatic. The strength measuring unit, referenced 113 in FIGURE 3, is not a mere strength indicating unit, but is arranged in any convenient manner known per se to control the phase shift produced by the phase shifter 11 so as automatically to maintain that phase shift at a value at which the input strength to the unit 113 from the mixer 8 is substantially zero. The control of the phase shifter 11 by the unit 113 may be, for example, by a motor driven shaft controlled by the said unit and is conventionally represented by a chain line 112. As in FIGURE 2 the setting of the phase shifter 11 is a measure of the range of the target.

It will be seen that in FIGURES 2 and 3, since the phase shifter 11 is adjusted to obtain substantially zero output from the mixer 8, the signal strength supplied over lead 10 to the velocity measuring and indicating equipment (not shown) will, when the adjustment in question is made, also be substantially zero. This defect could, of course, be met by providing switches or the like to enable the range and velocity measurements to be made at different times, but another and preferable way of meeting this difficulty is illustrated in the modification shown in FIGURE 4. Here a further mixer 108 is provided. This mixer receives one of its two inputs from the unit 7 and the other from the phase shifter 11 through a fixed 90° phase shifter 14, output from the further mixer 108 being fed over lead 10 to the velocity measuring and indicating equipment. With this arrangement when the unit 113 adjusts the phase shifter 11 to produce substantially zero output from the mixer 8 there will still be a good strong output signal from the mixer 108 for operating the velocity measuring and indicating equipment.

Figure 4:
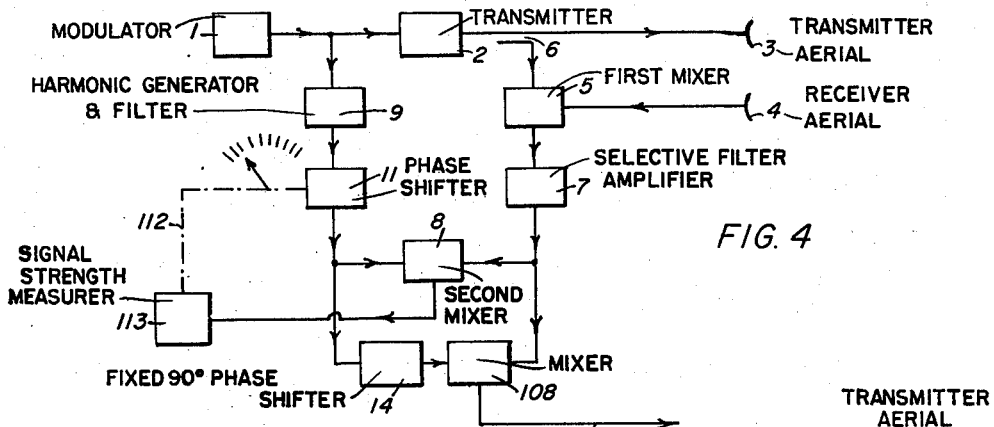

The arrangements shown in FIGURES 2, 3, and 4 are subject to the range ambiguity hereinbefore mentioned if the total range of the radar system is large. If this ambiguity is troublesome and is desired to be eliminated this may be done either by using two modulating frequencies which are not themselves in harmonic relation or two harmonics (not themselves in harmonic relation) of the same modulating frequency. An arrangement of this nature is shown in FIGURE 5 which may be regarded as an extension of the arrangement of FIGURE 3.

Figure 5:
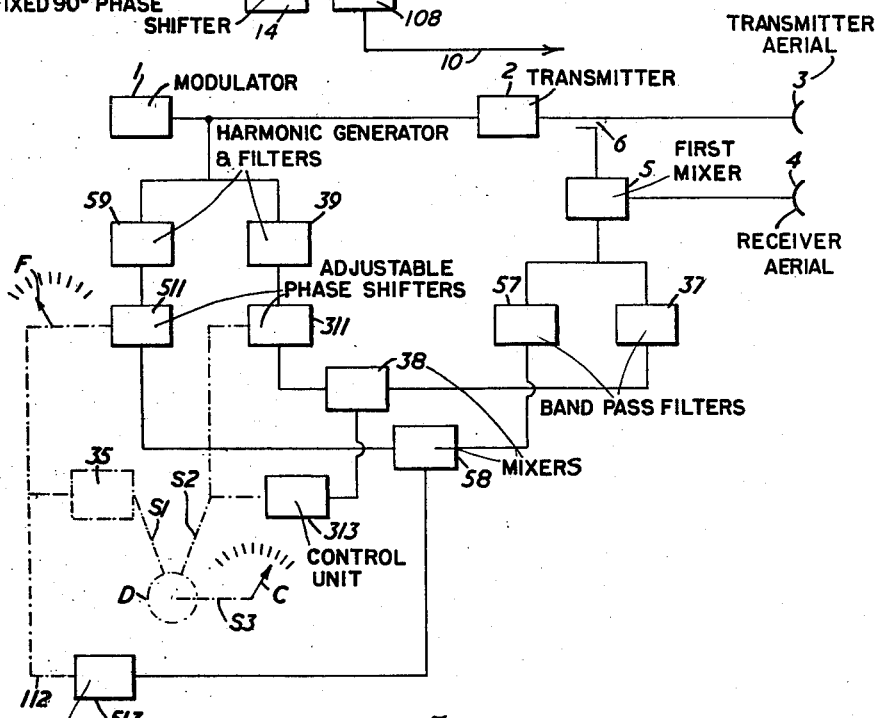

Referring to FIGURE 5 there are two harmonic generator-filter units 39 and 59 of which the former derives one harmonic (say the third) and the latter another (say the fifth) of the modulating frequency. These harmonics are not themselves in harmonic relationship. The third and fifth harmonic bands from the output of the mixer 5 are also respectively selected by the two band pass amplifiers 37 and 57. The units 39 and 59 feed respectively through adjustable phase shifters 311 and 511 to mixers 38 and 58 respectively and the second inputs to these mixers are taken from the units 37 and 57 respectively. The output of mixer 58 is fed to a strength responsive control unit 513 which controls the adjustment of the phase shifter 511 to maintain the output of the mixer 58 substantially at zero. The output from the mixer 38 is similarly fed to a strength responsive control unit 313 which similarly controls the phase shift produced by the phase shifter 311 to maintain the output from mixer 38 substantially at zero. It is assumed as before that the control outputs from the control units 313 and 513 are in the form of movements of control shafts. The control shaft 112 which drives the adjustment of the phase shifter 511 carries an indicating pointer here marked F and also drives a 3/5 ratio gear box 35 whose output shaft represented at S1 drives one input shaft of a differential gear D. The control shaft controlled by the unit 313 controls the adjustment of the phase shifter 311 and also drives the second input shaft S2 of the differential gear D. The differentially driven third shaft S3 (i.e. the output shaft) of the differential gear D, drives a second indicating pointer C. It will be seen that with this arrangement the pointer C is a coarse indicating pointer and the poitner F a fine indicating pointer, the former pointer C indicating the sub-range in which the target lies and the fine indicating pointer F indicating where the target is in that sub-range.

Figure 6:
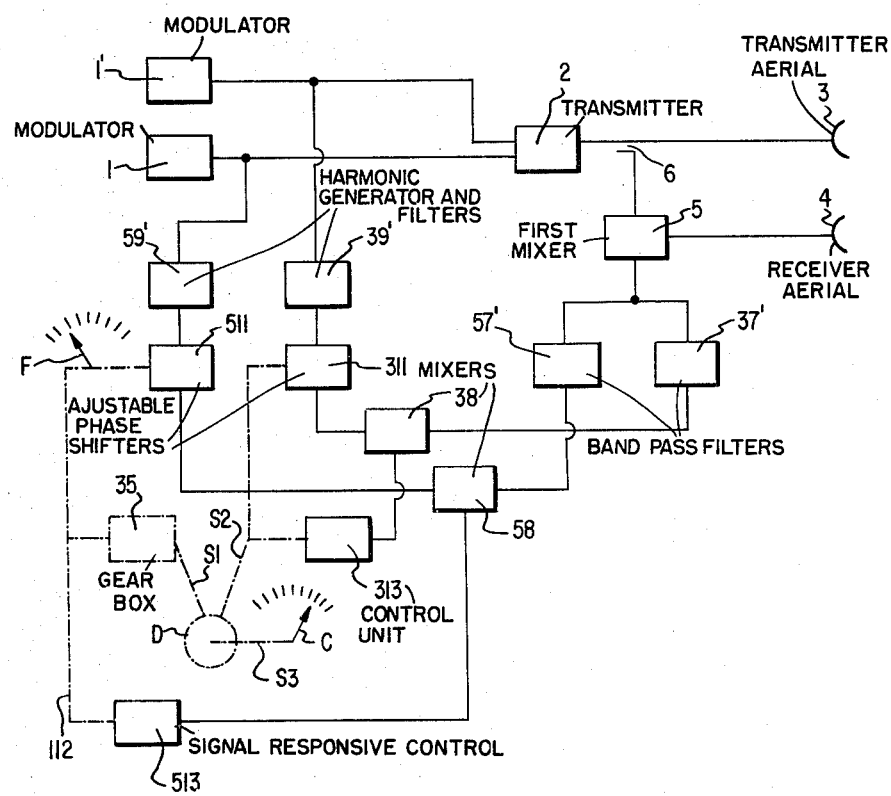

Instead of using two harmonics of a single modulating frequency, two modulating frequencies may be used and the Nth harmonic of both of them selected. FIGURE 6 illustrates this arrangement. In FIGURE 6, sources 1 and 1' are two separate modulating frequency sources providing two modulating frequencies of which one is for example 5/3 of the other; the units 39' and 59' are harmonic generators and filters connected, respectively, to sources 1' and 1 and adapted to generate the Nth harmonic of the lower and upper modulating frequencies respectively; and the units 37' and 57' are band pass amplifiers adapted to select the Nth harmonic frequency bands appropriate to the lower and upper modulating frequencies respectively. The other units of FIGURE 6 would be as already described.

In FIGURES 5 and 6, no means for deriving signals for velocity measurements are shown. Such means could, however, be provided as already described in connection with the other figures. Such means are not, of course, per se part of this invention.

I claim:

1. A range measuring radar system comprising a transmitter adapted to transmit a modulated high frequency radio wave, means for modulating said transmitter by at least one predetermined continuous wave modulating frequency, means for receiving reflected signals, a first mixer for mixing received reflected transmitted energy with energy taken from said transmitter; means for selecting from the output of said mixing means a predetermined band of frequencies, said band including a predetermined selected harmonic of said modulating frequency; means for deriving from said modulating means the same predetermined harmonic of said frequency; a second mixer, means for feeding said predetermined band of frequencies and said selected harmonic derived from said modulating means through two channels to said mixer, an adjustable phase shifter connected in one of said channels, means to feed the output from said second mixer to a signal strength measuring device, and means to indicate the range when phase shift adjustment provides zero output from said second mixer.

2. A radar system as claimed in claim 1 wherein said signal strength measuring device is adapted to automatically control said phase shift adjustment until the said input signal strength is brought substantially to zero.

3. A radar system as set forth in claim 1 comprising a further mixer, 90° phase shift means, means for applying as one input to said further mixer output from said adjustable phase shifter via said 90° phase shifter, means for applying, as another input to said further mixer, said predetermined band of frequencies, and a frequency measuring device connected to the output of said further mixer to determine target velocity.

4. A range measuring radar system comprising a transmitter adapted to transmit a modulated high frequency radio wave, means for modulating said transmitter including at least two sources of continuous wave modulating frequency of different values which are not in harmonic relation coupled to said transmitter, means for receiving reflected signals, a first mixer for mixing received reflected transmitted energy with energy taken from said transmitter, means for selecting from the output of the first mixer two predetermined bands of frequencies, each of said bands including a predetermined harmonic of one or other of the two modulating frequencies; means for deriving from each of the two modulating frequencies the same predetermined harmonic thereof; a second mixer, means for feeding the selected harmonic frequency band corresponding to one modulating frequency and the derived harmonic of that frequency to the second mixer through two channels, a first adjustable phase shifter included in one of said channels; means for utilizing the strength of the resultant of this mixing automatically to adjust said phase shifter until said resultant is substantially of zero strength; a third mixer, means for feeding the selected harmonic frequency band corresponding to the other modulating frequency and the derived harmonic of that frequency through two further channels to said third mixer; a second adjustable phase shifter included in one of said further channels; means for utilizing the output of the third mixer automatically to adjust said second phase shifter until the resultant of this mixing is substantially of zero strength; means for indicating the adjustment of one of the phase adjusters; means for multiplying the adjustment effected on said first phase shifter by the ratio of the two modulating frequencies; means for differentially combining the multiplied adjustment with the adjustment of the second phase shifter; and means for indicating the resultant of the differential combination.

5. A range measuring radar system comprising a transmitter adapted to transmit a modulated high frequency radio wave, means for modulating said transmitter by at least one predetermined continuous wave modulating frequency, means for receiving reflected signals, a first mixer for mixing received reflected transmitted energy with energy taken from the transmitter, means for selecting from the output of the first mixer, two separate predetermined bands of frequencies each including one or other of two different harmonics, which are not themselves in harmonic relation, of the modulating frequency; a harmonic generator for deriving the same two harmonics of the modulating frequency; a second mixer, means for feeding the upper selected harmonic band and the upper derived harmonic through two channels to said mixer, a first adjustable phase shifter included in one of said channels; means for utilizing the output of the second mixer automatically to adjust said phase shifter until said resultant is of substantially zero strength; a third mixer, means feeding the lower selected harmonic band and the lower derived harmonic through two further channels to said third mixer, a second adjustable phase shifter included in one of said further channels; means for utilizing the output of the third mixer automatically to adjust the second phase shifter until the resultant of this mixing is of substantially zero strength; indicating means for the adjustment of one of the two phase shifters; means for multiplying the adjustment effected by said first phase shifter by the ratio of the two harmonics; means for differentially combining the multiplied adjustment with the adjustment of the other phase shifters; and means for indicating the resultant of the differential combination.

References Cited in the file of this patent

UNITED STATES PATENTS

| | | |
|---|---|---|
| 2,453,169 | Varian | Nov. 9, 1948 |
| 2,935,743 | Glegg | May 3, 1960 |
| 2,958,862 | Rey | Nov. 1, 1960 |
| 3,026,515 | Rey | Mar. 20, 1962 |

FOREIGN PATENTS

| | | |
|---|---|---|
| 671,461 | Great Britain | May 7, 1952 |